United States Patent
Murphy et al.

(10) Patent No.: US 10,645,916 B2
(45) Date of Patent: May 12, 2020

(54) INTEGRATED LIGHTING SYSTEM IN A CARBON FIBER BOOM AND METHOD THEREOF

(71) Applicant: Deere & Company, Moline, IL (US)

(72) Inventors: Patrick M. Murphy, Ankeny, IA (US); Philip R. Johnson, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 183 days.

(21) Appl. No.: 15/724,353

(22) Filed: Oct. 4, 2017

(65) Prior Publication Data

US 2019/0098888 A1 Apr. 4, 2019

(51) Int. Cl.

| | |
|---|---|
| *A01M 7/00* | (2006.01) |
| *A01B 76/00* | (2006.01) |
| *B05B 1/20* | (2006.01) |
| *B05B 12/00* | (2018.01) |
| *B05B 1/16* | (2006.01) |
| *B05B 13/00* | (2006.01) |
| *A01G 25/09* | (2006.01) |
| *B05B 15/656* | (2018.01) |

(52) U.S. Cl.
CPC ........... *A01M 7/0071* (2013.01); *A01G 25/09* (2013.01); *A01M 7/006* (2013.01); *A01M 7/0057* (2013.01); *B05B 1/16* (2013.01); *B05B 12/004* (2013.01); *B05B 13/005* (2013.01); *B05B 15/656* (2018.02); *A01B 76/00* (2013.01); *B05B 1/20* (2013.01)

(58) Field of Classification Search
CPC .. A01M 7/0057; A01M 7/006; A01M 7/0071; A01G 25/09; A01B 76/00; B05B 1/16; B05B 1/20; B05B 1/205; B05B 12/004; B05B 13/005; B05B 15/656

See application file for complete search history.

(56) References Cited

U.S. PATENT DOCUMENTS

| | | | | |
|---|---|---|---|---|
| 6,719,009 | B1 * | 4/2004 | Bissen | .................... B66C 23/64 137/615 |
| 6,786,233 | B1 * | 9/2004 | Anderson | ............... B66C 23/64 137/615 |

(Continued)

FOREIGN PATENT DOCUMENTS

| | | |
|---|---|---|
| DE | 202015007429 U1 | 11/2015 |
| EP | 1468605 A1 | 10/2004 |

OTHER PUBLICATIONS

European Search Report, European Patent Office, European Patent Application Ser. No. 18197952, dated Feb. 12, 2019, 11 pages.

*Primary Examiner* — Darren W Gorman
(74) *Attorney, Agent, or Firm* — Taft Stettinius & Hollister LLP; Stephen F. Rost (57) ABSTRACT

A spray boom includes a body having a length defined between a first end and a second end thereof. The body is formed by a plurality of layers of composite material adapted to be molded together to form an inner surface and an outer surface. An internal cavity is defined in the body internally of the inner surface. A light-emitting system is integrally formed in the body in an outer layer thereof or at a location between the inner surface and the outer surface. The light-emitting downsystem has an on state and an off state in which it is adapted to emit a light when in the on state.

11 Claims, 8 Drawing Sheets

(56) References Cited

U.S. PATENT DOCUMENTS

| | | | |
|---|---|---|---|
| 6,842,119 B2* | 1/2005 | Nurse | B66C 23/905 |
| | | | 212/348 |
| 8,476,828 B2 | 7/2013 | Hayashi et al. | |
| 2013/0256433 A1 | 10/2013 | Gunthorpe | |
| 2014/0048611 A1* | 2/2014 | Palmquist | A01C 23/007 |
| | | | 239/1 |
| 2014/0048612 A1 | 2/2014 | Snyder et al. | |
| 2015/0259911 A1* | 9/2015 | Freebury | E04C 3/005 |
| | | | 52/108 |
| 2015/0298402 A1* | 10/2015 | Li | B29C 70/446 |
| | | | 138/177 |
| 2016/0198640 A1* | 7/2016 | Singh | A01G 7/045 |
| | | | 362/96 |
| 2016/0286781 A1 | 10/2016 | Mariani et al. | |

* cited by examiner

INTEGRATED LIGHTING SYSTEM IN A CARBON FIBER BOOM AND METHOD THEREOF

FIELD OF THE DISCLOSURE

The present disclosure relates to a boom, and in particular, to a carbon fiber boom designed with an integrated lighting system.

BACKGROUND

Agricultural equipment and work machines may include a boom mounted to a chassis or frame. The boom may be pivotally mounted at one end with one or more implements coupled thereto. Hydraulic lines, electrical wires, plumbing and other pipes, tubes, wires, and the like are routed to various locations along the boom. A self-propelled sprayer, for example, may include a boom with a plurality of nozzles disposed along the length of the boom for performing a spraying operation. In a conventional steel boom, the wires, pipes, hydraulic lines, and the like are routed externally along the boom and coupled thereto via fasteners or other coupling means.

During a spraying operation, and particularly at dusk or at night, it is often difficult to see the spray pattern being emitted from the plurality of nozzles. With carbon fiber and other composites used to manufacture booms, the overall weight of the boom is decreasing. However, with the decrease in weight, booms are being assembled at longer lengths. In one example, an overall boom length from end-to-end may be approximately 130 feet. In another example, it is possible for boom lengths to reach 150-170 feet. In view of this, the distance from the cab where the operator is controlling the machine to each end of the boom may be far and thus more difficult to see the spray pattern.

SUMMARY

In one embodiment of the present disclosure, a spray boom includes a body having a length defined between a first end and a second end thereof, the body formed by a plurality of layers of composite material adapted to be molded together to form an inner surface and an outer surface; an internal cavity defined in the body internally of the inner surface; and a light-emitting system integrally formed in the body in an outer layer thereof or at a location between the inner surface and the outer surface, the light-emitting system having an on state and an off state in which it is adapted to emit a light when in the on state.

In one example of this embodiment, the body includes a top side, a bottom side, a first side, and a second side; and the light-emitting system is integrally formed in the bottom side of the body configured to emit light in a substantially downward direction onto an underlying ground or crop canopy. In a second example, a second light-emitting system may be integrally formed in the body, the second light-emitting system being spaced laterally or circumferentially from the first light-emitting system. In a third example, a second light-emitting system may be coupled externally to the outer surface of the body, the second light-emitting system being coupled via adhesive, welding, or a mechanical fastener.

In a fourth example, the spray boom may include a wire electrically coupled to the light-emitting system, the wire adapted to be coupled to a power source for providing electrical energy to the light-emitting system in the on state, wherein the wire is routed through the internal cavity. In a fifth example, a channel may be formed in the body between the inner surface and the outer surface, the channel extending along the length and defined between the first end and the second end; and a wire is electrically coupled to the light-emitting system, the wire adapted to be coupled to a power source for providing electrical energy to the light-emitting system in the on state, wherein the wire is routed through the channel. In a further example, the light-emitting system includes a plurality of individual lights independently operably controllable between the on state and off state.

In another embodiment of this disclosure, a method of manufacturing a carbon fiber boom includes providing a first boom mold and a second boom mold; placing at least a first layer of composite material in the first boom mold and the second boom mold; depositing at least a second layer of composite material in the first boom mold and the second boom mold; adding a light-emitting system in the first layer or between the at least first layer and the at least second layer of composite material in one of the first boom mold and the second boom mold; pressurizing the first and second molds to compress the at least first and second layers together; assembling the first and second molds together to form a single mold assembly; applying heat pressure to the single mold assembly to form the carbon fiber boom; and forming the carbon fiber boom to include an outer surface formed by the at least first layer, an inner surface spaced radially from the outer surface, and an internal cavity defined internally of the inner surface.

In one example of this embodiment, the method may include adding a second light-emitting system in between the at least first and second layers at a location spaced laterally or circumferentially from the first light-emitting system. In a second example, the method may include depositing additional layers of composite material on the at least second layer before the pressurizing step. In a third example, the method may include depositing a plurality of layers of composite material in the first and second booms; and adding at least one additional light-emitting system between any two of the plurality of layers. In a fourth example, the method may include compressing the layers together and dispersing resins during the pressurizing step.

In another example of this embodiment, the method may include adding layers to the first and second molds after the pressurizing step; and repeating the pressurizing step to compress the additional layers together. In a further example of this embodiment, the method may include electrically coupling a wire to the light-emitting system; and routing the wire through the internal cavity formed in the carbon fiber boom. In yet another example, the method may include coupling a second light-emitting system to the outer surface of the carbon fiber boom via an adhesive, welding, or a mechanical fastener.

In a further embodiment of the present disclosure, a spray boom assembly includes a first boom frame comprising a body having a length defined between a first end and a second end thereof, the body formed by a plurality of layers of composite material adapted to be molded together to form an inner surface, an outer surface, and an internal cavity defined internally of the inner surface; a second boom frame comprising a body having a length defined between a first end and a second end thereof, the body formed by a plurality of layers of composite material adapted to be molded together to form an inner surface, an outer surface, and an internal cavity defined internally of the inner surface; a control system including a controller adapted to control a function of the spray boom assembly; and a light-emitting system integrally formed in the body of the first boom frame, the light-emitting system being formed in an outer layer or at a location between the inner surface and the outer surface of the body of the first boom frame, the light-emitting system being electrically coupled to the controller; wherein, the light-emitting system comprises an on state and an off state, and the light-emitting system is operably controlled by the controller to emit a light when in the on state and to be disabled in the off state.

In one example of this embodiment, the assembly may include a second light-emitting system integrally formed in the body of the second boom frame, the second light-emitting system being formed in an outer layer or at a location between the inner surface and the outer surface of the body of the second boom frame, the second light-emitting system being electrically coupled to the controller; wherein, the second light-emitting system comprises an on state and an off state, and the second light-emitting system is operably controlled by the controller independently of the first light-emitting system to emit a light when in the on state and to be disabled in the off state. In a second example, an operator control may be electrically coupled to the light-emitting system and adapted to control the light-emitting system between its on and off states.

In another example of this embodiment, the control system may include a sensor coupled to the first or second boom frame and disposed in electrical communication with the controller, the sensor configured to detect dusk and dawn conditions and send a signal indicative of dusk or dawn to the controller; wherein, the controller operably controls the light-emitting system from its off state to its on state when dusk is detected by the sensor, and from its on state to its off state when dawn is detected by the sensor. In a further example, a second light-emitting system may be coupled externally to the outer surface of the body of the first or second boom frame, the second light-emitting system being coupled to the outer surface via adhesive, welding, or a mechanical fastener; wherein, the second light-emitting system comprises an on state and an off state, and the second light-emitting system is operably controlled by the controller independently of the first light-emitting system to emit a light when in the on state and to be disabled in the off state.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

While several paragraphs of the Detailed Description are intended to be amended with this response, the amendments are clerical in nature and include, in most instances, only adding the appropriate reference numbers to claimed features and other features presented in the Drawings. Additionally, the lateral and circumferential directions have been defined to provide additional clarity to the terms "laterally" and "circumferentially".

Corresponding reference numerals are used to indicate corresponding parts throughout the several views.

DETAILED DESCRIPTION

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Figure 1:
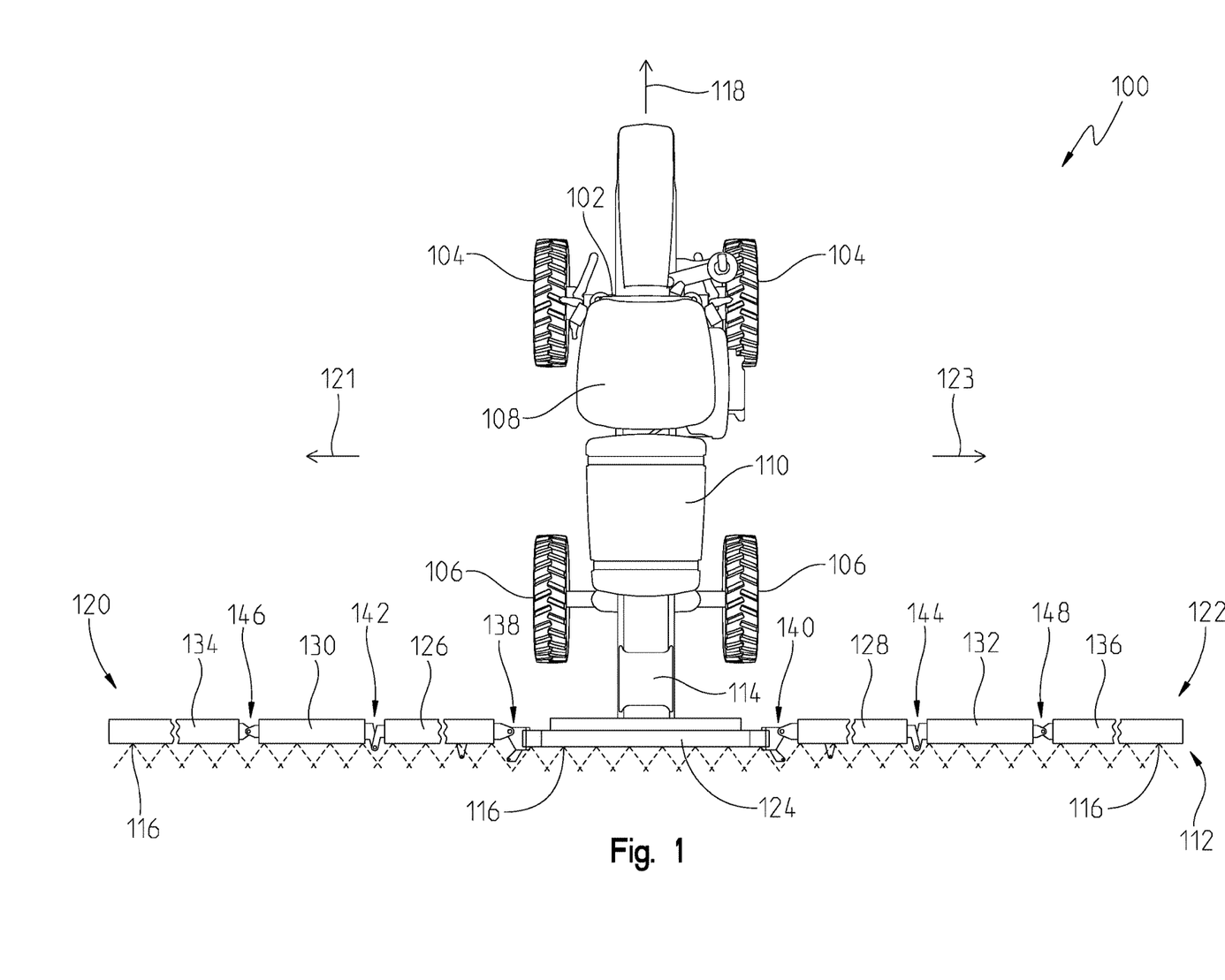
FIG. 1 is a top view of a sprayer system attached to a work machine.

Referring to FIG. 1, an example of a vehicle carrying a spray boom with spray nozzles mounted on the boom. The vehicle may be a platform or dolly for industrial spray applications or a tractor towing ground-engaging tillage left/right wings with disks and shanks, or a planter towing a row of seed dispenser modules. In the illustrated embodiment of FIG. 1, the vehicle is a towed sprayer or a self-propelled agricultural sprayer 100 including a vehicle main frame 102 and an attached autonomous control station or an operator cab 108 for controlling the sprayer 100. The main frame 102 may be supported by a plurality of ground-engaging mechanisms. In FIG. 1, a pair of front wheels 104 and a pair of rear wheels 106 support the main frame and may propel the vehicle in at least a forward travel direction 118. A tank 110 may be mounted to the frame 102 or another frame (not shown) which is attached to the main frame 102. The tank 110 may contain a spray liquid or other substance to be discharged during a spraying operation.

A fixed or floating center frame 114 is coupled to a front or a rear of the main frame 102. In FIG. 1, the center frame 114 is shown coupled to the rear of the main frame 102. The center frame 114 may support an articulated folding spray boom assembly 112 that is shown in FIG. 1 in its fully extended working position for spraying a field. In other examples, the spray boom assembly 112 may be mounted in front of the agricultural sprayer 100.

A plurality of spray nozzles 116 can be mounted along a fluid distribution pipe or spray pipe (not shown) that is mounted to the spray boom assembly 112 and fluidly coupled to the tank 110. Each nozzle 116 can have multiple spray outlets, each of which conducts fluid to a same-type or different-type of spray tip. The nozzles 116 on the spray boom assembly 112 can be divided into boom frames or wing structures such as 124, 126, 128, 130, 132, 134, and 136 (or collectively "spray section(s)"). In FIG. 1, the plurality of groups or sections may include a center boom frame 124 which may be coupled to the center frame 114. Although not shown in FIG. 1, a lift actuator may be coupled to the center frame 114 at one end and to the center boom frame 124 at the opposite end for lifting or lowering the center boom frame 124.

The spray boom assembly 112 may be further divided into a first or left boom 120 and a second or right boom 122. The left boom 120 extends away from the center boom frame 124 in a first lateral direction 121 generally perpendicular to the forward direction of travel 118, the right boom 122 extends away from the center boom frame 124 in a second lateral direction 123 opposite the first lateral direction and generally perpendicular to the forward direction of travel 118. In FIG. 1, the first boom 120 is shown on a left side of the spray boom assembly 112, and the second boom 122 is depicted on the right side thereof. In some instances, a left-most portion of the center boom frame 124 may form part of the first boom 120 and a right-most portion may form part of the second boom 122. In any event, the first boom 120 may include those boom frames which are disposed on a left-hand side of the spray boom assembly 112 including a first inner boom frame 126 (or commonly referred to as a "left inner wing"), a first outer boom frame 130 (or commonly referred to as a "lift outer wing"), and a first breakaway frame 134. Similarly, the second boom 122 may include those boom frames which are disposed on a right-hand side of the spray boom assembly 112 including a second inner boom frame 128 (or commonly referred to as a "right inner wing"), a second outer boom frame 132 (or commonly referred to as a "right outer wing"), and a second breakaway frame 136. Although seven boom frames are shown, there may any number of boom frames that form the spray boom assembly 112.

As shown in FIG. 1, the first boom frame 126 may be pivotally coupled to the center boom frame 124 at a first hinge location 138 via any known mechanical coupling. Other means for coupling the first boom frame 126 to the center boom frame 124 at the first hinge location 138 may be used. Similarly, the first outer boom frame 130 may be pivotally coupled to the first inner boom frame 126 at a third hinge location 142 according to known means, and the first breakaway frame 134 may be coupled to the first outer boom frame 130 at a fifth hinge location 146 according to known means. In alternative cases, these connections may be rigid connections, whereas in other embodiments such as the one in FIG. 1 the frames may be pivotably coupled to one another. Moreover, the second inner boom frame 128 may be coupled to the center boom frame 124 at a second hinge location 140, and the second outer boom frame 132 may be coupled to the second inner boom frame 128 at a fourth hinge location 144. Likewise, the second breakaway frame 136 may be coupled to the second outer boom frame 136 at a sixth hinge location 148. These couplings may be pivotal connections or rigid connections depending upon the type of boom. Any known or conventional type of coupling mechanism may be used for pivotally or rigidly coupling adjacent boom frames to one another.

In a conventional spray boom assembly, a tilt actuator may be provided for tilting each boom with respect to the center frame. In FIG. 1, for example, a first tilt actuator may be coupled at one end to the center frame 114 or the center boom frame 124, and at an opposite end to the first boom 120. During operation, the first boom 120 may be pivoted with respect to the center frame 114 or center boom frame 124 such that the first breakaway frame 134 may reach the highest point of the first boom 120. This may be useful if the sprayer 100 is moving in the travel direction 118 and an object is in the path of the first boom 120 such that the tilt actuator (not shown) may be actuated to raise the first boom 120 to avoid contacting the object. The same may be true of the second boom 122. Here, a second tilt actuator (not shown) may be actuated to pivot the second boom 122 with respect to the center frame 114 or the center boom frame 124.

Figure 2A:
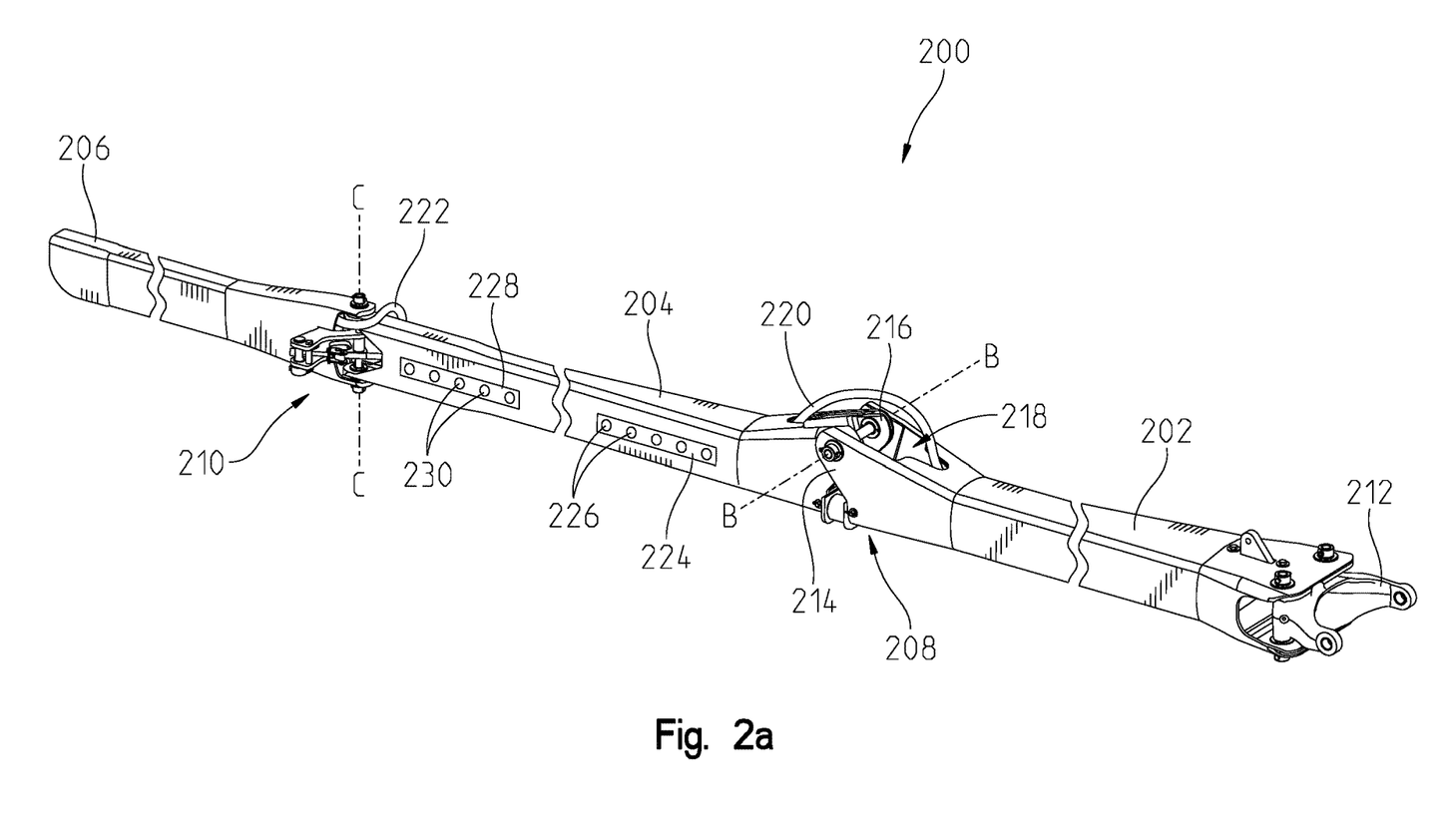
FIGS. 2a and 2b are perspective views of a portion of a spray boom showing, in FIG. 2a, a light assembly integrated with the spray boom and, in FIG. 2b, a light assembly external to the spray boom.
Figure 2B:
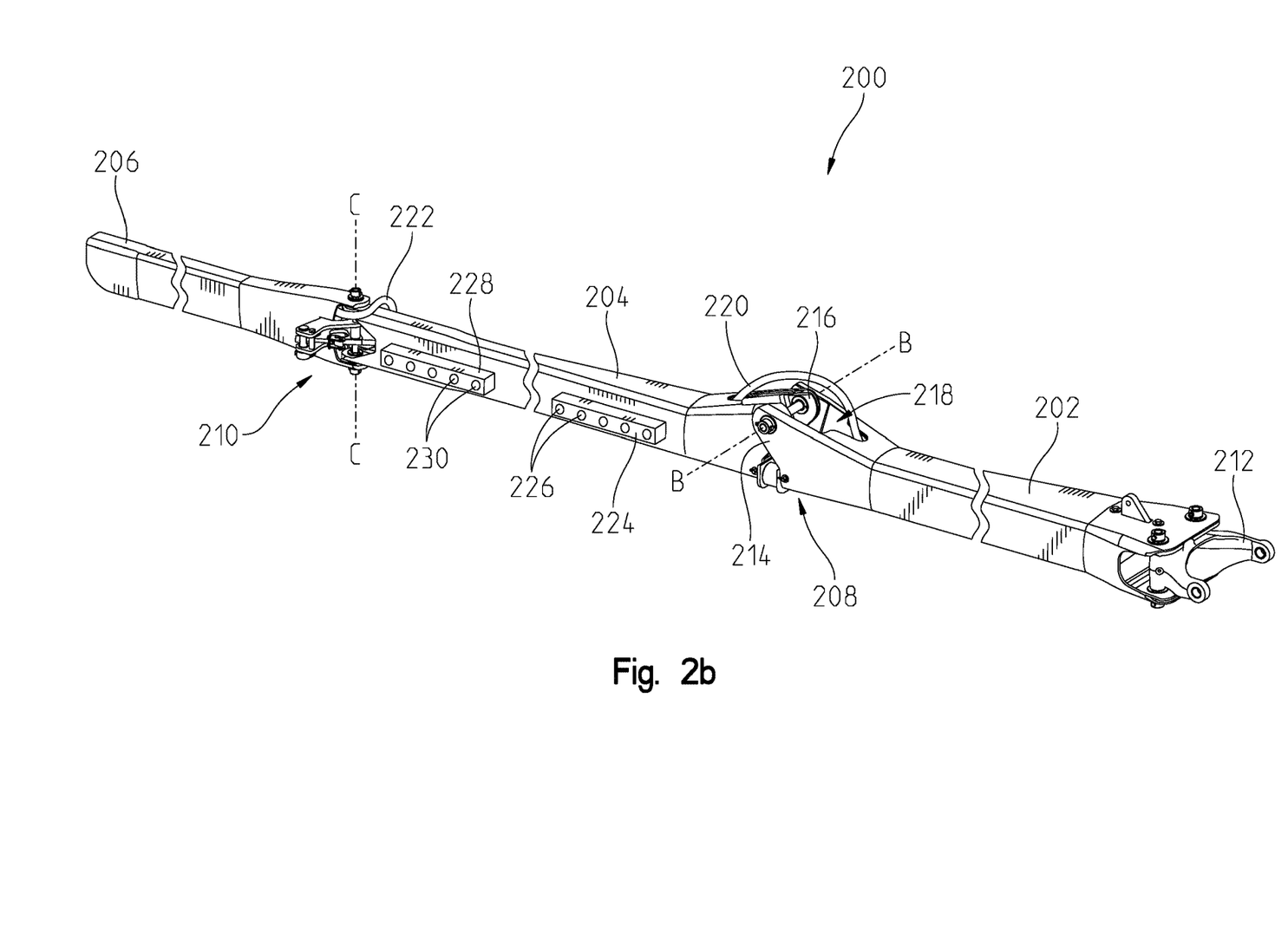

Referring to FIG. 2, an embodiment of a portion of a carbon fiber boom 200 is shown. The boom 200 is shown as including a first boom frame 202, a second boom frame 204, and a third boom frame 206. The first boom frame 202 may be similar to the first inner wing or boom frame 126 of FIG. 1, while the second boom frame 204 may be similar to the first outer wing or boom frame 130 and the third boom frame 206 may be similar to the breakaway mechanism 134. In any event, the boom frames may be pivotally or rigidly coupled to one another.

In FIG. 2, the boom frames are shown as being pivotally coupled to one another. For instance, the first boom frame 202 may be pivotally coupled to the second boom frame 204 at a first hinge location 208 such that the two frames are able to pivot about a pivot axis B-B. Similarly, the second boom frame 204 and third boom frame 206 may be pivotally coupled to one another at a second hinge location 210 about a second pivot axis C-C. Any known type of coupling means may be used for pivotally coupling adjacent boom frames to one another.

The first boom frame 202 may include a yoke 212 or other means for coupling to a center frame or other structure of a boom system. Moreover, the first boom frame 202 is shown having an ear or protruding portion 214 for pivotally coupling to an ear or protruding portion 216 of the second boom frame 204. As shown, a fastener or other coupling means may pivotally couple the protruding portions to one another to permit pivotal movement therebetween. The same type of design or structure may be incorporated to allow pivotal movement between the second boom frame 204 and the third boom frame 206.

As shown in FIG. 2, an opening 218 or space is defined at the first hinge location 208 between the first boom frame 202 and the second boom frame 204. The opening 218 may be sized to allow a hose or cable 220 to pass from inside the first boom frame 202 to inside the second boom frame 204. The same may be true of a second hose or cable 222 which passes between the second boom frame 204 and the third boom frame 206. Each cable or hose may be used to transfer hydraulic fluid from a fluid tank or reservoir to each nozzle located along the entire length of the boom 200. Since the boom frames pivot relative to one another, each hose or cable may have a degree of flexibility to allow for the pivotal movement.

If the cable 220 is an electrical cable or wire, it may allow for electrically coupling a sensor 229 or lighting assembly 224, 228 or other electrical component on the different boom frames to a controller 225 or other electrical component. For example, there may be a position sensor or global positioning sensor located at the end of the third boom frame 206. This sensor may be in communication with a controller for controlling the position and movement of the boom 200. Since the carbon boom 200 in FIG. 2 may be designed without any external wires, cables, plumbing, etc., the cables 220 allow for communication (either electrical or hydraulic) to exist between adjacent boom frames. Thus, these cables serve as "jumper" cables in the sense they couple wires, cables, hoses, plumbing, etc. between the different boom frames. While a cable 220 is shown in FIG. 2, other means may be used for achieving the same function. It should be appreciated that the terms lighting assembly, light assembly, and light-emitting system are used interchangeably throughout.

As shown in the embodiment of FIG. 2, a first lighting assembly 224 and a second lighting assembly 228 may be coupled to the second boom frame 204. Although not shown, additional lighting assemblies may be coupled to the first boom frame 202 and the third boom frame 206. Each lighting assembly may include a plurality of lights such as light-emitting diodes, bulbs, or the like. Any type of light may be used for each lighting assembly. The first lighting assembly 224 may include a plurality of lights 226 and the second lighting assembly 228 may include a plurality of lights 230. Each of the lighting assemblies shown in FIG. 2 may be integrated within the layers of composite material that forms each boom frame. In FIG. 2, each light assembly is shown as a string or strip of lights, it is within the scope of this disclosure that a light assembly may including a single light or be shaped in any desirable shape to project light from the boom.

In addition to integrating the light assembly into the boom, it is also possible to attach a light assembly externally to the boom. For instance, a lighting assembly may be adhered, welded, mechanically fastened, or coupled in any other known manner to the external surface of the boom.

Figure 6:
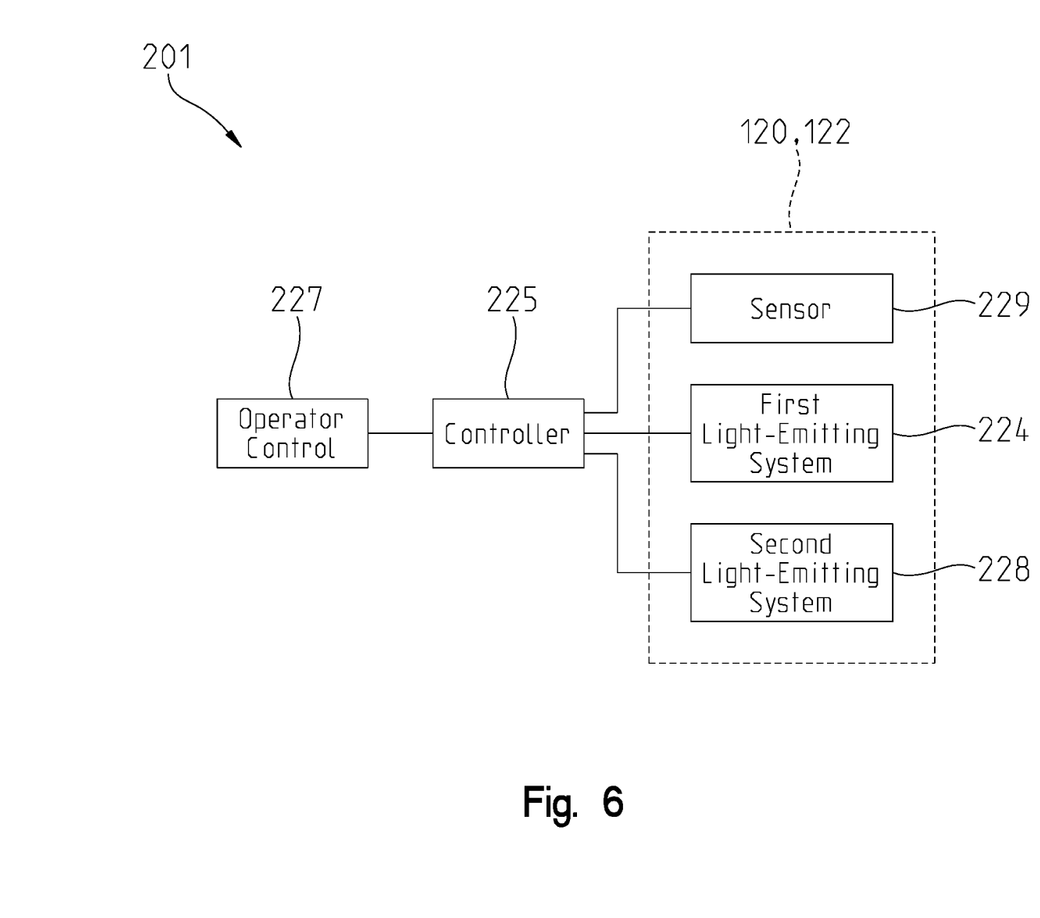
FIG. 6 is block diagram of a control system included in the work machine.

As shown in FIG. 6, the first and second light assemblies 224, 228 (and any other light assembly on the boom) may be electrically coupled to a controller 225 or operator control 227 for operability. For instance, the one or more wires may be coupled between each lighting assembly 224, 228 and the operator cab where the operator may selectively turn each light assembly on or off. This may be achieved via a button, switch, or other operator control. Moreover, the operator may actuate the operator control 227 to turn the light assembly on or off, and in doing so a signal is sent to a controller 225 which triggers the light assembly on or off. Alternatively, a sensor 229 may be provided on the work machine, i.e., its chassis or a boom frame 120, 122, for detecting when it is getting dusk or dark outside (e.g., a dusk-to-dawn photocell or sensor). The sensor 229 or photocell (not shown) may send a signal to the controller 225 indicating this condition, and the controller 225 may be programmed to trigger the light assembly on. The same may be true in an early morning (i.e., dawn) when the sun begins to rise and the same sensor 229 detects it is no longer dark, and thus the light assembly may be triggered off. The sensor 229 may alert the controller 225 and the controller 225 in turn may turn the light assembly off.

The controller may further be programmed to turn on only those light assemblies coupled to those boom frames in which nozzles are being used to conduct a spraying operation. Thus, to save power consumption on the work machine (e.g., a sprayer), light assemblies coupled to those boom in which nozzles are not being used may be turned off. This mode of control may be automatic, and the operator may have the option of manually turning on or off each of the light assemblies. Other control features may be possible with one or more light assemblies on the boom assembly. For instance, a motion sensor (not shown) may be coupled to one of the boom frames for detecting an object. If an animal or object moves in a path of the machine and spray boom, the sensor may communicate the detection of the object to the controller which in turn may trigger the light assemblies to turn on.

Figure 3:
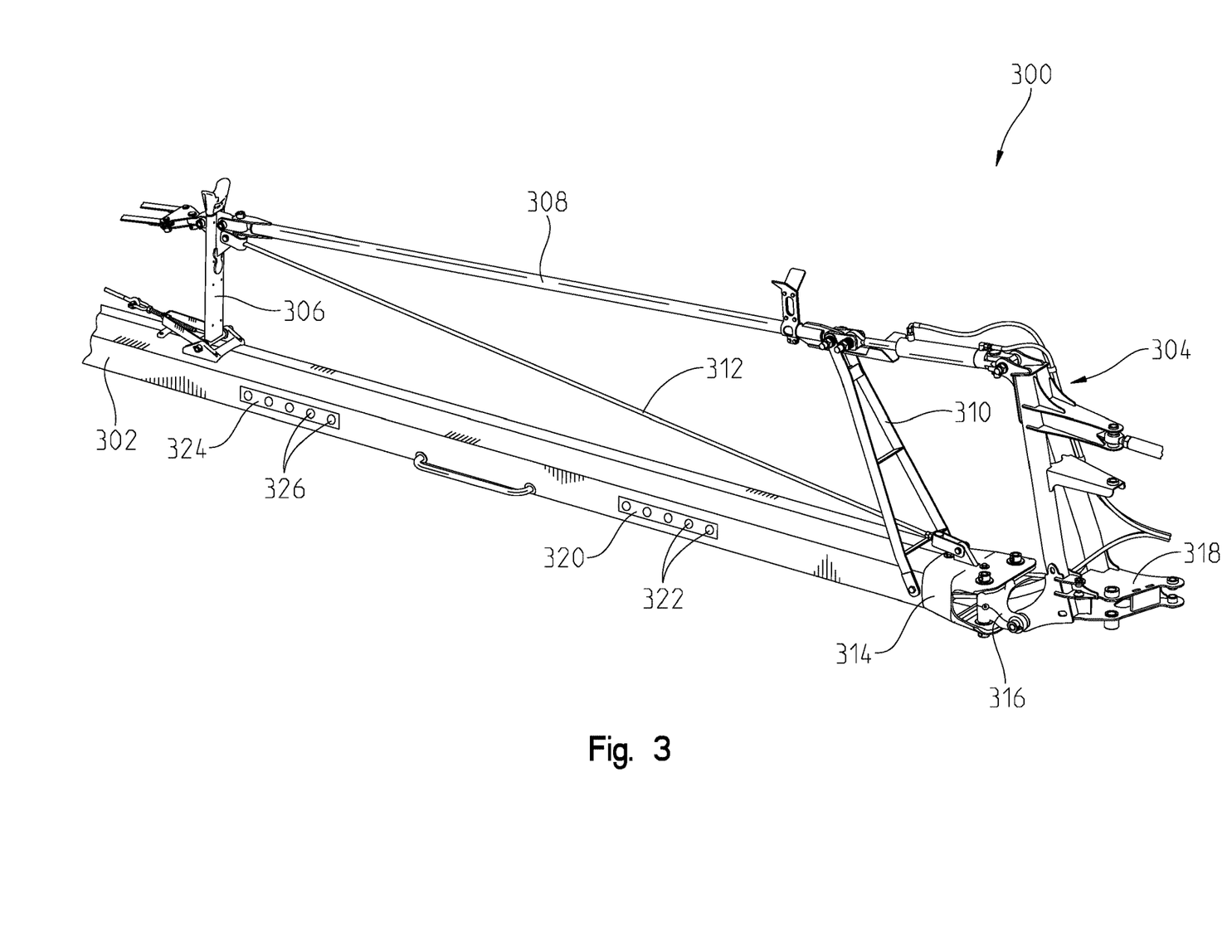
FIG. 3 is a perspective view of another embodiment of a portion of a spray boom with a lighting system.

Referring to FIG. 3, another embodiment of a portion of a carbon fiber boom 300 is shown. The boom 300 is shown having one or more boom frames 302 that form the boom 300. In this example, the boom frame 302 may be disposed closest to the center frame of the spray boom, and as such it may be coupled via a plurality of supports. For instance, a first end support 304 may be mounted to a center frame mount 318. A second end support 306 may be coupled to the boom frame 302, and the first end support 304 and second end support 306 may support a fluid pipe 308 for the transfer of fluid to a plurality of nozzles mounted to the boom 300. As also shown, first a support member 310 and a second support member 312 may also aid in supporting the fluid pipe 308.

The boom frame 302 may further include a connector member 314 may be pivotally coupled to a frame connector 316, as shown in FIG. 3. While the supports and connector members are shown in detail in FIG. 3, these are only shown by way of an example. Other embodiments of boom frames may not include such structures similar to the one shown in FIG. 2.

In FIG. 3, the boom frame 302 is shown including a first lighting assembly 320 and a second lighting assembly 324. The first lighting assembly 320 may include a plurality of lights 322 and the second lighting assembly 324 may include a plurality of lights 326. Each lighting assembly may be formed within an outer layer of the carbon fiber boom such that it is integrated into the boom during its manufacturing process.

Similar to FIG. 2, wires or the like may be used to electrically couple each lighting assembly to an operator control located in a cab of the work machine. Each lighting assembly may also be electrically coupled to a controller, which may automatically trigger the lighting assembly on or off based on current conditions or other criteria stored in a software program loaded in the controller. For example, a sensor may detect whether it is dark enough for the light assembly to be triggered on. If so, the controller may be programmed to automatically trigger the light assembly on. The operator may also manually trigger each light assembly on or off from the cab.

In any event, as shown in FIG. 6, a control system 201 may be provided on the work machine in which a controller 225 is electrically coupled to one or more light assemblies 224, 228 on a boom 120, 122 similar to that shown in FIGS. 2 and 3. The one or more light assemblies 224, 228 may be integrated within an outer layer or layer of the carbon fiber boom 120, 122 during its manufacturing process. An example of how the light assembly 224, 228 may be integrated into the carbon fiber boom 120, 122 during its manufacturing process is further described below with respect to FIG. 5.

The control system 201 may also include an operator control 227 for manual control of the one or more light assemblies 224, 228. In addition, one or more sensors 229 may be provided in the control system 201. One sensor may be in electrical communication with the controller 225 to detect if the one or more light assemblies 224, 228 are triggered on or off. The sensor may communicate the status of each light assembly 224, 228 to the controller 225. A second sensor may be provided to detect an operation status of one or more nozzles on a respective boom frame. The second sensor may communicate whether the plurality of nozzles on a boom frame is operating or not. A third sensor may be used to detect a distance from the boom frame to the underlying ground or crop canopy. The third sensor may communicate this distance to the controller. Another sensor 229 may detect environmental conditions such as darkness, and communicate this to the controller 225. Other sensors may form part of the control system and detect different parameters and communicate the same to the controller.

In turn, the controller may be programmed to receive these communications from the different sensors and operably control the one or more light assemblies between their on or off states. For instance, if the controller determines that it is dusk and the work machine is moving, it may automatically trigger the light assemblies on. Alternatively, the controller may receive the communication about the plurality of nozzles on one boom frame not being active, and in turn the controller may trigger the light assembly or light assemblies on that particular boom frame to their off state. The controller may be programmed in other manners to control the one or more light assemblies which are integrated in the carbon fiber boom.

In one example of a light assembly, the light assembly may include a plurality of lights similar to the ones shown in FIGS. 2 and 3. In this example, each of the plurality of lights may be part of a different circuit such that the controller may control each of the plurality of lights individually and independently of the other lights within the same light assembly. Moreover, in some instances, one or more light assemblies may be coupled to the external surface of the boom frame, rather than be integrated in the carbon fiber boom as described previously. The externally coupled light assemblies may be controlled independently of the light assemblies which are integrated within the carbon fiber boom.

Figure 4A:
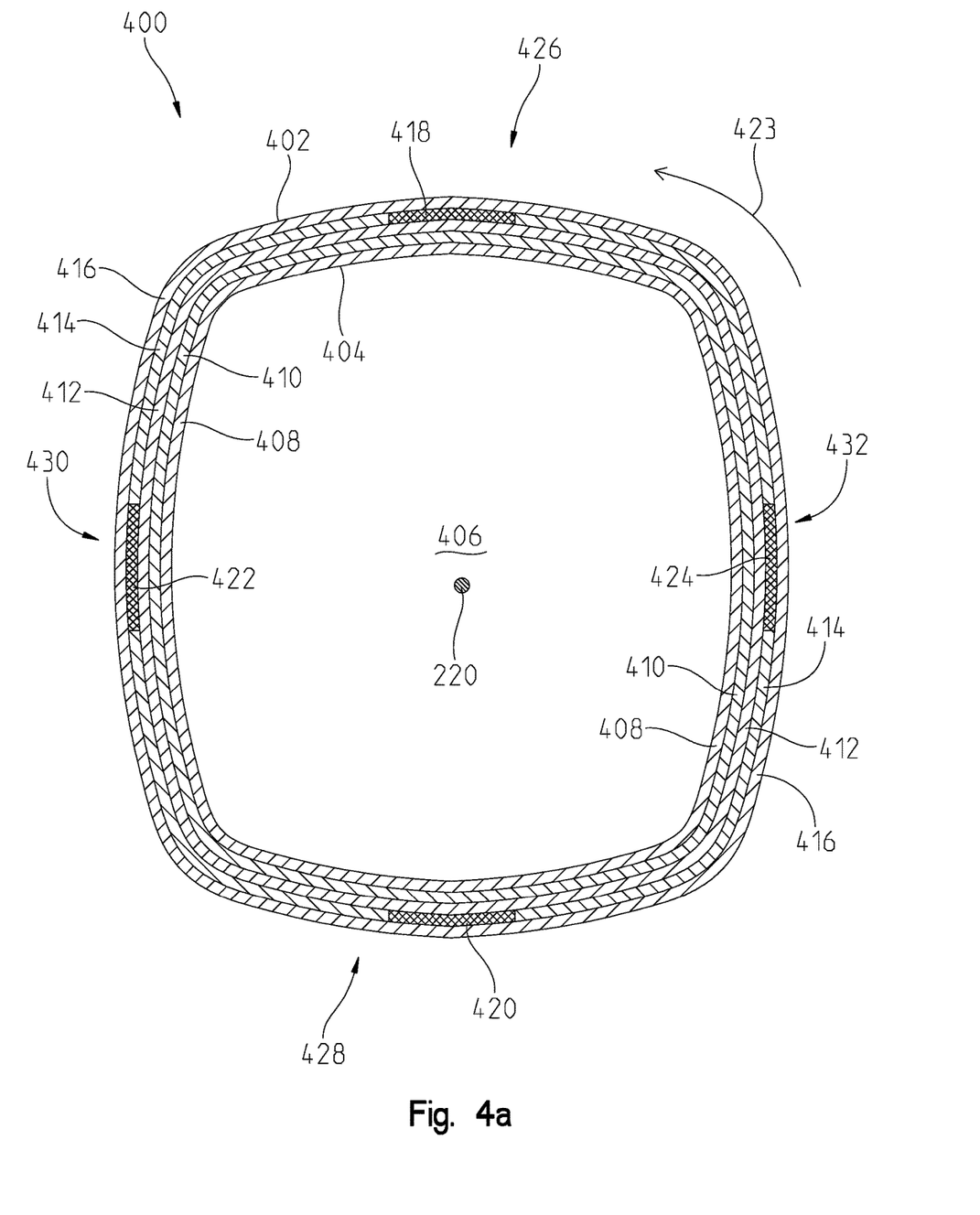
FIGS. 4a and 4b are cross-sectional views of another embodiment of a spray boom with an integrated lighting assembly showing, in FIG. 4a, a wire routed internally through the spray boom and, in FIG. 4b, a wire routed in a channel formed in a body of the spray boom.
Figure 4B:
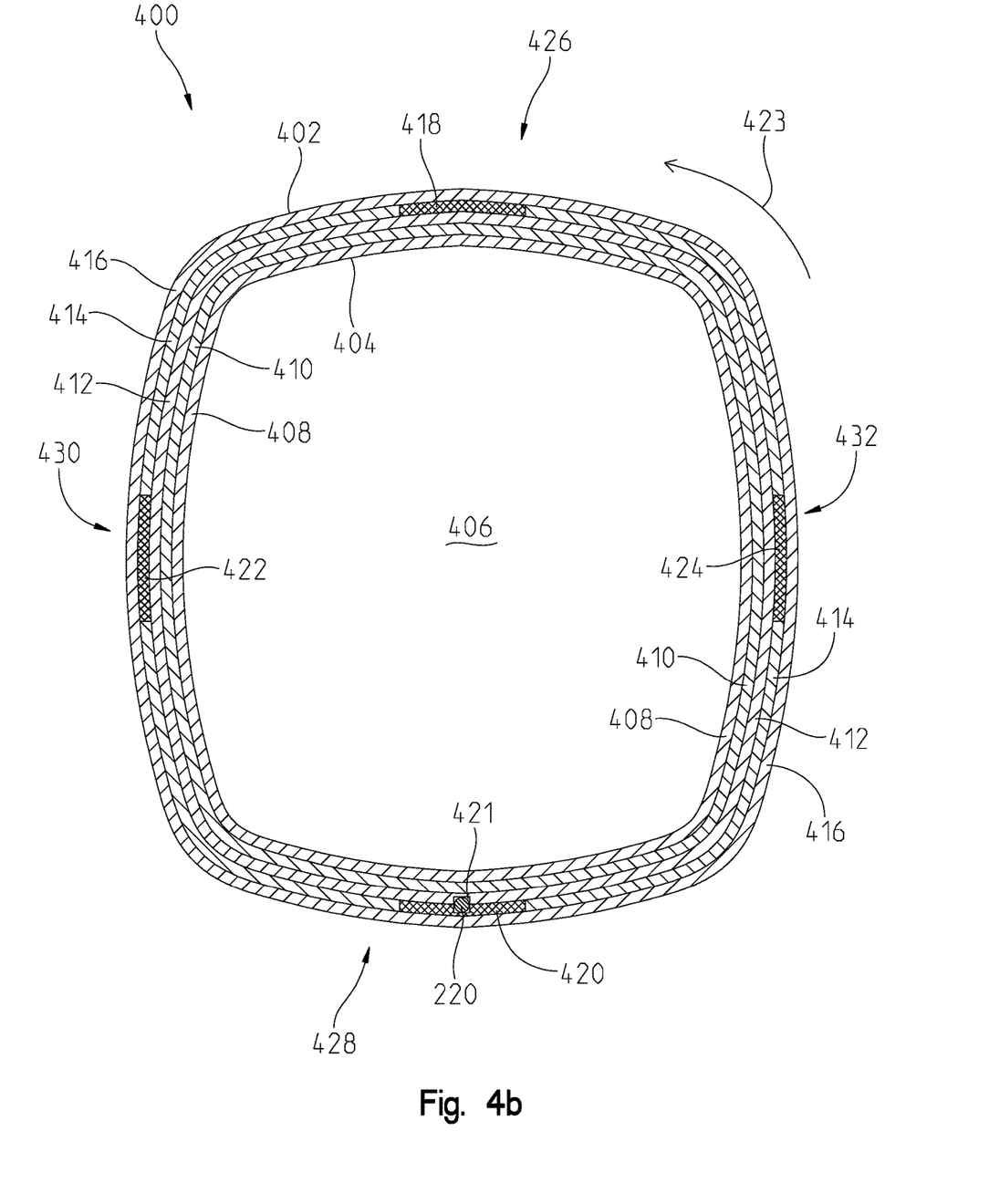

In FIG. 4, a further embodiment of a cross-sectional view of a boom frame 400 is shown. This boom frame 400 may be similar to that of FIGS. 2 and 3. Here, the boom frame 400 may include an outer surface 402 and an inner surface 404, where the distance therebetween defines an overall thickness, ti, of the boom frame 400. The boom frame 400 may be formed by a hand-laying process or other known process where a plurality of layers is stacked and molded to one another to form the carbon fiber boom. The plurality of layers may be formed of a carbon fiber or fiberglass material, and each layer may comprise a sheet of material.

In FIG. 4, the plurality of layers may include a first layer 408, a second layer 410, a third layer 412, a fourth layer 414, and a fifth layer 416. The first layer 408 may be the innermost layer that coincides with the inner surface 404, whereas the fifth layer 416 is the outermost layer that coincides with the outer surface 402. Although five layers are shown and described herein, it is contemplated that any number of layers may be used to form the boom frame 400.

As shown in FIG. 4, an area internal of the first layer 408 is an internal cavity 406. As such, the boom frame 400 may be substantially hollow as shown. Wires, cables, hoses, pipes, and the like may be routed through the cavity 406 as desired.

The boom frame 400 of FIGS. 4a and 4b may include one or more light assemblies defined in one layer or between two of the plurality of layers. For example, the boom frame 400 may include a first light assembly 418, a second light assembly 420, a third light assembly 422, and a fourth light assembly 424. As shown, each light assembly is located at a different location or position of the boom frame 400. For example, the first light assembly 418 may be disposed at a top end 426 of the boom frame 400. The second light assembly 420 may be disposed at a bottom end 428 of the boom frame 400. Further, the third light assembly 422 may be located at a first end 430 of the boom frame 400, and the fourth light assembly 424 may be located at a second end 432 thereof. Each light assembly 418, 420, 422, and 424 may be spaced apart from one another in the circumferential direction 423 (or spaced apart circumferentially), meaning that, when the boom frame 400 is viewed in cross-section as shown in FIGS. 4a and 4b, each light assembly is spaced apart from one another. FIG. 4a includes the cable (or wire) 220, routed through the internal cavity 406, and FIG. 4b includes the cable (or wire) 220 routed through the channel 421. While the channel 421 is illustratively defined in FIG. 4b between the third layer 412 and the fourth layer 414 and at the bottom end 428 of the boom frame 400, it should be appreciated the channel 421 maybe be defined anywhere in the body of the boom frame 400 so long as the channel 421 is between the outer surface 402 and the inner surface 404.

In this embodiment, each light assembly is shown being formed part of the fourth layer 414. In other embodiments, the light assembly may be formed in an outer layer of the boom frame. This may include the fifth and outermost layer 416 of FIG. 4. Although not shown in FIG. 4, the thickness of the boom frame 400 may increase at the location of each such that a bulge may be formed.

Figure 5:
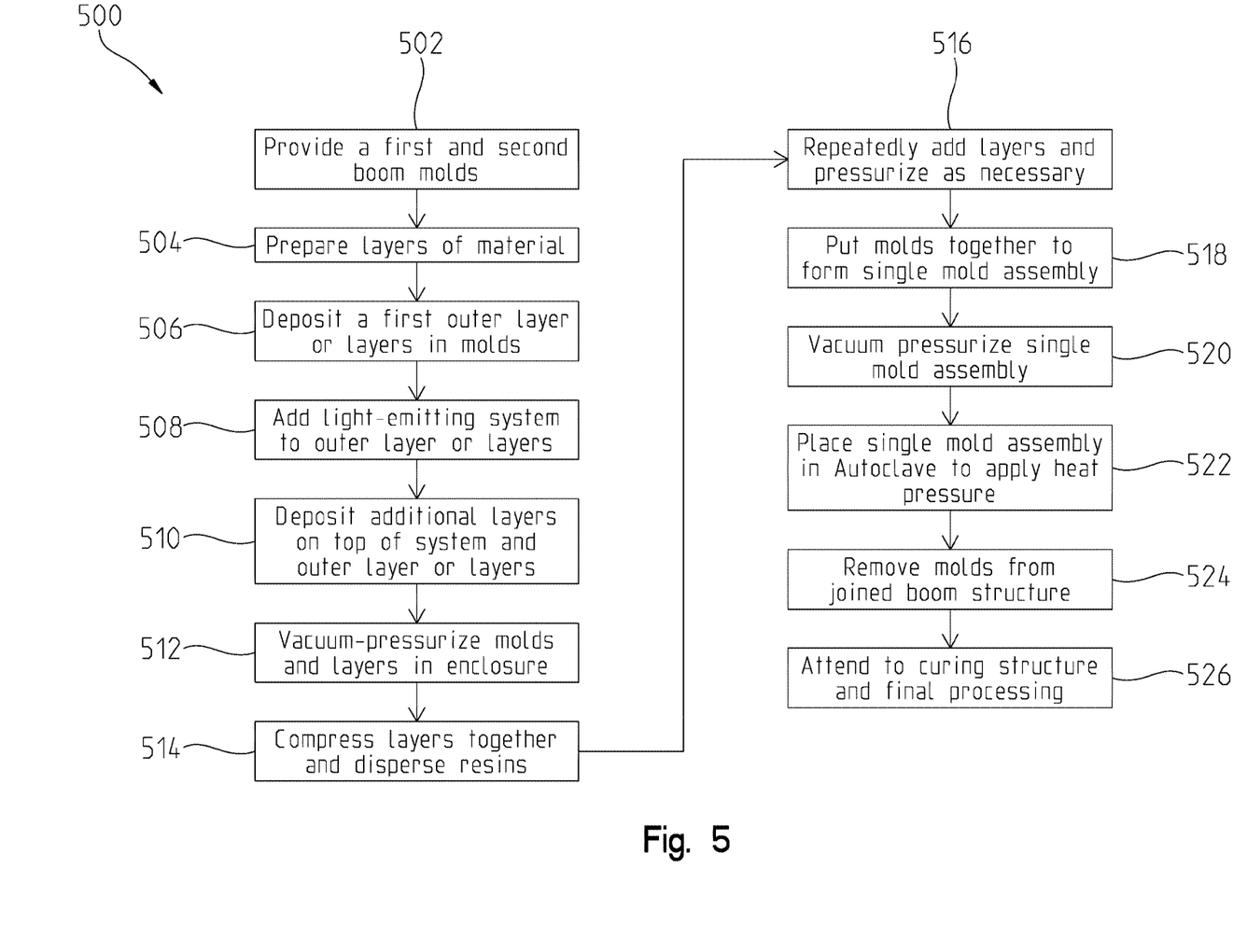
FIG. 5 is a flow diagram of one embodiment of a method of manufacturing a carbon fiber boom with an integrated lighting assembly.

Turning to FIG. 5, one embodiment is provided of a method for manufacturing a carbon fiber boom in accordance with the present disclosure. In particular, this method provides a process for integrating the aforementioned light assemblies into a boom formed of composite, fiberglass or combination thereof during a hand-laying manufacturing process. The method 500 may include a plurality of blocks or steps for manufacturing the boom. In FIG. 5, a plurality of blocks is shown as one example of this process. It is to be understood that the process may include fewer or additional blocks. Moreover, the arrangement or sequential order of the blocks depicted in FIG. 5 may differ for other embodiments.

In a first block 502 of FIG. 5, a first and second boom molds may be provided. The first boom mold may be designed as a "male" boom mold and the second mold may be designed as a "female" boom mold. In a second block 504, the material used to form the boom may be provided and prepared for the process. Here, material such as carbon fiber, fiberglass, or other composite material may be provided in sheets, for example. Alternatively, the material may be provided as woven fabric, rovings, or chopped strains with a resin material.

In a third block 506, a first outer layer or layers may be deposited or laid in one or both molds. While a hand-laying process is described herein, there may be other methods for placing the layers of material in the molds. Any known process may be used. Once the first outer layer or layers is placed in the mold(s), the method 500 may advance to block 508 where a light-emitting system is integrated or otherwise added to the outer layer or layers in one or both molds. Here, cavities or other indentations may be formed in the outer layer or layers of the mold and the light-emitting system may be added in the cavity or indentation. The light-emitting system may include a strand of lights, a strip of lights, a single light, or any known type or form of light-emitting device.

The light-emitting system may include a wire for electrically coupling to a circuit or controller. In this manner, the wire may be routed through the central cavity 406 similar to that shown in FIG. 4. Alternatively, or in addition, a channel or a hollow PVC or composite tube or pipe may be integrated between layers such that the wire may be routed through the channel or pipe.

Additional layers may be added to the molds in block 510 on top of first deposited layers. In one example, a first plurality of layers may be hand-laid during blocks 506 and 510. Once block 510 is completed, the method may advance to block 512 where the molds may be vacuum-pressurized in an enclosure. In one example, each mold may be placed in a bag and then vacuum-pressurized. During this process, the layers may be compressed together and resins dispersed between layers in block 514. The bag or enclosure may be removed after block 514 is executed. In block 516, additional layers may be added to each mold, and blocks 512 and 514 may be repeated as necessary. In block 516, a second plurality of layers of composite material may be added to each mold, and then both molds may be vacuum-pressurized in an enclosure (e.g., a bag) to compress the first and second plurality of layers and disperse resins. This may be repeated until the desired number of layers have been added to the first and second molds.

Once the first and second molds have the desired amount of layers, the method 500 advances to block 518 where the molds are assembled to one another to form a single mold assembly. The single mold assembly may be vacuum-pressurized in block 520. The entire mold may also be placed in an Autoclave in block 522 and heat pressure is applied to the single mold assembly. The heat pressure may further join the two molds together. After block 522 is completed, the method 500 may advance to block 524 where the molds are removed from the newly formed boom structure. The formed boom structure in block 524 may have a shape of the two molds, and further curing and final processing may be executed in block 526 to form the final carbon fiber boom.

It is noteworthy that in block 508, the manufacturing process may include strategically placing the light-emitting system in the mold (either the first or second mold) such that it is disposed in a desired location. This may include positioning the light-emitting system at a top end, bottom end, first side, or second side of the boom as shown in FIG. 4 and described above. Block 508 may further include integrating a plurality of light-emitting systems in the first or second molds such that the boom has more than one light-emitting system.

The carbon fiber boom is now manufactured with the integrated light-emitting system formed in the outer layer or between two stacked layers of composite material. Although not shown in FIG. 5, wires, cables, pipes, hoses, and the like may be routed through the internally formed cavity 406 or integrally formed passageways or channels.

In view of the above, a carbon fiber boom or boom frame may be manufactured with integrated light assemblies at any desirable location along the boom. The addition of cables, wires, or piping may be necessary to couple light assemblies to their own circuit or to adjacent boom frames. By integrally adding light-emitting systems to the carbon fiber boom during the boom manufacturing process, a source of light may be provided to an operator when performing a spraying or other work operation at dusk or night.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A spray boom, comprising:
a body having a length defined between a first end and a second end thereof, the body formed by a plurality of layers of composite material molded together to form an inner surface and an outer surface;
an internal cavity defined in the body internally of the inner surface;
a first light-emitting system integrally formed in the body in an outer layer thereof or at a location between the inner surface and the outer surface, the first light-emitting system having an on state and an off state in which it is adapted to emit a light when in the on state; and
a control system including a controller adapted to control a function of the spray boom;
wherein the control system further comprises a sensor coupled to the body and disposed in electrical communication with the controller, the sensor configured to detect dusk and dawn conditions and send a signal indicative of dusk or dawn to the controller; and
wherein, the controller operably controls the first light-emitting system from its off state to its on state when dusk is detected by the sensor, and from its on state to its off state when dawn is detected by the sensor.

2. The spray boom of claim 1, wherein:
the body comprises a top side, a bottom side, a first side, and a second side; and
the first light-emitting system is integrally formed in the bottom side of the body configured to emit light in a substantially downward direction onto an underlying ground or crop canopy.

3. The spray boom of claim 1, further comprising a second light-emitting system integrally formed in the body, the second light-emitting system being spaced laterally or circumferentially from the first light-emitting system.

4. The spray boom of claim 1, further comprising a second light-emitting system coupled externally to the outer surface of the body, the second light-emitting system being coupled via adhesive, welding, or a mechanical fastener.

5. The spray boom of claim 1, further comprising a wire electrically coupled to the first light-emitting system, the wire adapted to be coupled to a power source for providing electrical energy to the first light-emitting system in the on state, wherein the wire is routed through the internal cavity.

6. The spray boom of claim 1, further comprising:
a channel formed in the body between the inner surface and the outer surface, the channel extending along the length and defined between the first end and the second end; and
a wire electrically coupled to the first light-emitting system, the wire adapted to be coupled to a power source for providing electrical energy to the first light-emitting system in the on state, wherein the wire is routed through the channel.

7. The spray boom of claim 1, wherein the first light-emitting system comprises a plurality of individual lights independently operably controllable between the on state and off state.

8. A spray boom assembly, comprising:
a first boom frame comprising a body having a length defined between a first end and a second end thereof, the body formed by a plurality of layers of composite material molded together to form an inner surface, an outer surface, and an internal cavity defined internally of the inner surface;
a second boom frame comprising a body having a length defined between a first end and a second end thereof, the body formed by a plurality of layers of composite material be molded together to form an inner surface, an outer surface, and an internal cavity defined internally of the inner surface;

a control system including a controller adapted to control a function of the spray boom assembly; and a first light-emitting system integrally formed in the body of the first boom frame, the first light-emitting system being formed in an outer layer or at a location between the inner surface and the outer surface of the body of the first boom frame, the first light-emitting system being electrically coupled to the controller;

wherein, the first light-emitting system comprises an on state and an off state, and the first light-emitting system is operably controlled by the controller to emit a light when in the on state and to be disabled in the off state;

wherein the control system comprises a sensor coupled to the first or second boom frame and disposed in electrical communication with the controller, the sensor configured to detect dusk and dawn conditions and send a signal indicative of dusk or dawn to the controller; and wherein, the controller operably controls the first light-emitting system from its off state to its on state when dusk is detected by the sensor, and from its on state to its off state when dawn is detected by the sensor.

9. The spray boom assembly of claim 8, further comprising a second light-emitting system integrally formed in the body of the second boom frame, the second light-emitting system being formed in an outer layer or at a location between the inner surface and the outer surface of the body of the second boom frame, the second light-emitting system being electrically coupled to the controller;

wherein, the second light-emitting system comprises an on state and an off state, and the second light-emitting system is operably controlled by the controller independently of the first light-emitting system to emit a light when in the on state and to be disabled in the off state.

10. The spray boom assembly of claim 8, further comprising an operator control electrically coupled to the first light-emitting system and adapted to control the first light-emitting system between its on and off states.

11. The spray boom assembly of claim 8, further comprising a second light-emitting system coupled externally to the outer surface of the body of the first or second boom frame, the second light-emitting system being coupled to the outer surface via adhesive, welding, or a mechanical fastener;

wherein, the second light-emitting system comprises an on state and an off state, and the second light-emitting system is operably controlled by the controller independently of the first light-emitting system to emit a light when in the on state and to be disabled in the off state.

* * * * *